Oct. 2, 1945.   D. G. IHRIG   2,386,118
BATTERY-GENERATOR POWER SUPPLY SYSTEM
Filed Dec. 9, 1944
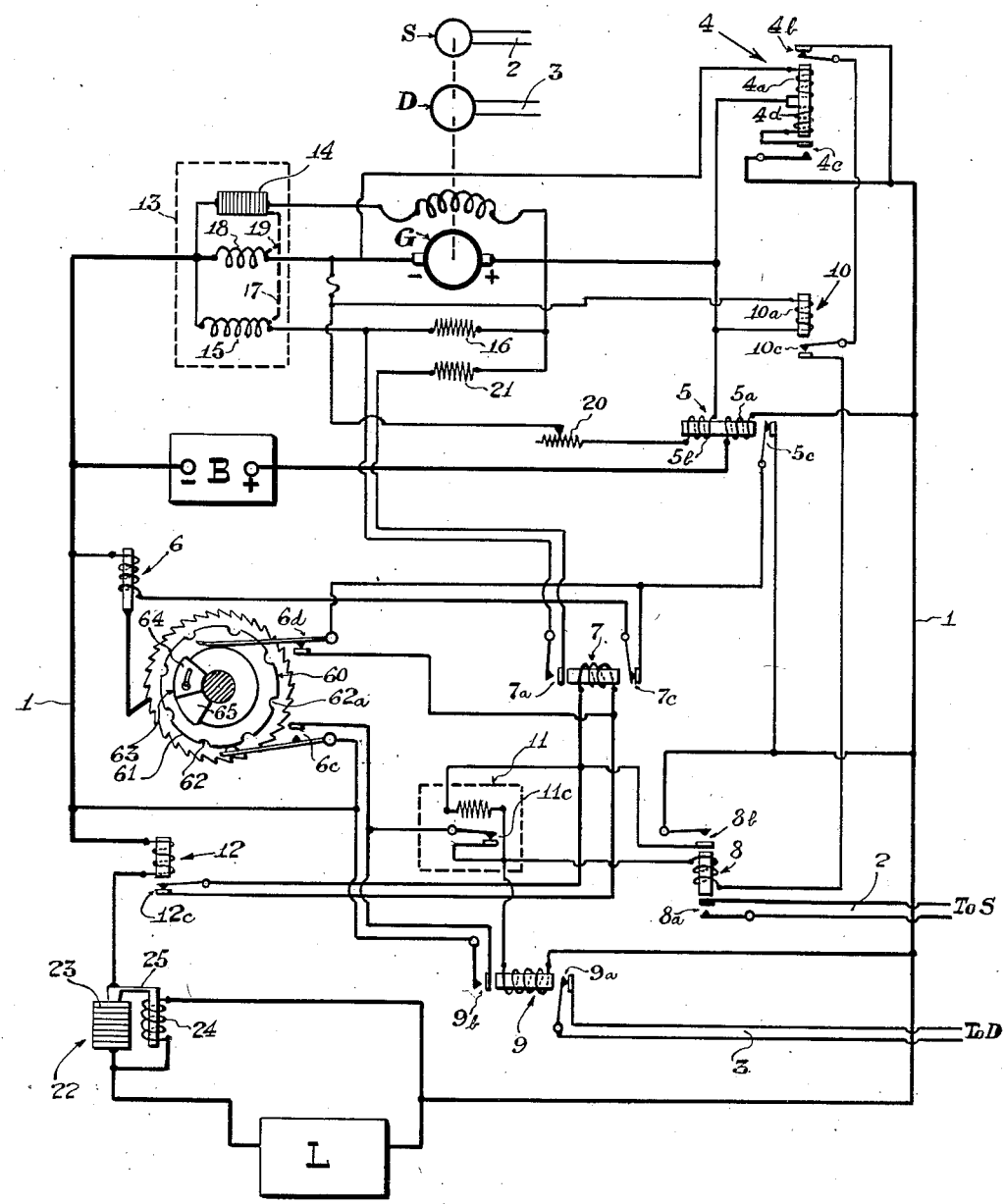
Inventor
Donald G. Ihrig
By
Henry Lanahan
Attorney Patented Oct. 2, 1945

2,386,118

UNITED STATES PATENT OFFICE 2,386,118

BATTERY-GENERATOR POWER SUPPLY SYSTEM

Donald G. Ihrig, Evanston, Ill., assignor to Thomas A. Edison, Incorporated, West Orange, N. J., a corporation of New Jersey Application December 9, 1944, Serial No. 567,334

15 Claims. (Cl. 290—30)

This invention relates to systems for supplying continuous power and more particularly to engine-driven generator systems which include batteries as a standby for supplying the power during temporary periods.

The invention is especially adapted for use on railway cars for supplying lighting current and other miscellaneous loads, but has general utility in applications where the load requirements vary between wide limits.

The invention has for the general objects thereof to provide a battery-generator system having improved economy in operation, improved efficiency, better stability, longer life and less maintenance requirements. Especially, it is an object to provide a battery-generator lighting and power system for railway cars wherein the aforestated objects are fulfilled.

In typical systems of the character mentioned, the generator supplies both load current and battery-charging current, but during temporary intervals, as when the generator has to be stopped for servicing and repair or the current demand on the generator is too low to be supplied efficiently by the generator, the battery is used to supply the load. The generator is restarted automatically after a predetermined period of shutdown and is stopped automatically under controlled conditions. In railway lighting systems it has for example been the common practice to stop the generator whenever the total current demand on the generator—that is, the sum of the battery-charging current and the load current—falls to a predetermined minimum value. This mode of operation has, however, been unsatisfactory in that the battery charging is here not under satisfactory control because of varying load-current requirements. For example, if the load current is relatively high as the total current demand on the generator falls to the predetermined minimum value, the battery will be overcharged and, vice versa, if the load current is relatively low as the total current demand falls to that minimum value, the generator will be stopped while the battery is yet in an uncharged condition. This has resulted in shortening the life of the battery and in increasing the maintenance and service requirements of the system.

In accordance with the present invention these disadvantages are avoided by controlling the stopping of the generator according to the independent values of the load current and the battery-charging current. In a preferred mode of operation the generator is run continuously so long as the battery-charging current is above a predetermined minimum value—that is, so long as the battery is in a predetermined state of discharge—and/or the load current is above a predetermined minimum value, and the generator is stopped only when both the battery-charging current and the load current fall below their respective threshold values just noted (the load current being hereinafter termed as "heavy" and "light" when it is above and below its mentioned threshold value). Also, in my preferred mode of operation the generator supplies normally a voltage substantially higher than the nominal voltage of the battery so long as the battery is in a state of discharge, but to save fuel this voltage is reduced to substantially the nominal voltage of the battery when the battery reaches a substantially charged condition, the battery being merely "floated" on the line thereafter as the generator continues to run.

It is accordingly a further object of my invention to provide an improved battery-generator system of the character mentioned wherein the battery is charged rapidly, accurately and safely.

Another object is to provide an engine-driven battery-generator system having improved economy in fuel consumption.

Other objects and features of my invention are to control a battery-generator power system according to the respective values of the battery-charging current and the load current, to differently control the generator upon the battery reaching a predetermined state of charge according to whether or not the load current requirements are light or heavy, to control the generator voltage according to the state of charge of the battery, and to stop the generator automatically only when the independent values of the battery-charging current and the load current fall below predetermined threshold values.

A still further object of my invention is to provide novel and effective means for stabilizing the operation of the system during the interval when the generator voltage is reduced in response to the battery reaching a charged condition.

A yet further object is to provide novel and improved control means for causing the battery to be subjected to extra charging under predetermined conditions.

Other objects and features of my invention will more fully appear from the following description and the appended claims.

In the description, reference is had to the accompanying drawing showing a schematic diagram of circuits and mechanisms in accordance with the power supply system of my invention.

In this drawing G represents the generator, D represents a gas (propane) engine for driving the generator, S represents a starting mechanism for the engine, B represents the battery and L represents the load. The generator and battery supply current to the load by way of a line 1. Associated with the starting mechanism S is a starting circuit 2 and with the engine is a stopping circuit 3, the operation of these circuits being herein sufficiently described by the statement that the starting mechanism will be put into operation when the circuit 2 is closed and the engine will be stopped when the circuit 3 is closed. While I herein show an independent starting mechanism S, this is merely illustrative for as is known in the art the starting mechanism may comprise the generator G worked as a motor by power from the battery B.

The control elements of the system are shown in the positions which they occupy during the shutdown period of the generator. Thus, during shutdown, the starting circuit 2 is open and the stopping circuit 3 is closed. Also, the generator is disconnected from the line 1 by a pair of normally-open contacts 4c of a relay 4. The battery B is however connected continuously across the line through a winding 5a of a relay 5.

During the shutdown period of the generator a timing relay 6 of the notching type is energized from the line 1 through normally-closed contacts 7c of a relay 7 and normally-closed contacts 5c of the relay 5. When so energized, this relay continues to advance a cam 60 at a predetermined rate of say one revolution every two hours. By way of example this cam may have a circular peripheral face 61 with eight equally-spaced recesses or notches 62. A movable contact arm of a switch 6c is controlled by this cam and is normally held open so long as the arm contacts the peripheral face 61. However, when one of the notches 62 is moved into position for engagement by the contact arm, the arm is moved to a switch-closing position in response to a suitable biasing thereof not herein necessary to show. Thus, the switch 6c is operated for every fifteen minutes of continuous operation of the timing relay.

When the contacts 6c are closed, an engine-starting relay 8 and an engine-stopping relay 9 are connected across the line 1, the starting relay being connected by way of the normally-closed contacts 4b of the relay 4, normally-closed contacts 10c of a relay 10, normally-closed contacts 11c of a thermal relay 11 and the contacts 6c of the timing relay 6, and the stopping relay being connected by way of the contacts 11c and 6c. The starting relay has a pair of normally-open contacts 8a serially included in the engine-starting circuit 2 and the stopping relay 9 has a pair of normally-closed contacts 9a serially included in the engine-stopping circuit 3. Thus, as these relays are energized by the closing of the timing relay contacts 6c, the contacts 9a are opened to put the stopping mechanism for the engine out of operation and, simultaneously, the contacts 8a are closed to put the engine-starting mechanism into operation. The generator is accordingly started in response to the closing of the timing relay contacts 6c.

In accordance with my invention I provide means for controlling the voltage of the generator according to the state of charge of the battery and means for stopping the generator according to whether (1) the generator voltage builds up to normal value when the starting mechanism S is put into operation, i. e., to the value of the nominal battery voltage, or more, (2) the battery is charged or discharged and (3) the load current is light or heavy. A basic device in the present system for controlling the stopping of the generator is the relay 11. For example, this relay controls the energizing circuit of the stopping relay 9 and causes the stopping circuit 3 to be closed to stop the engine when the relay 11 opens. A basic device in controlling the voltage of the generator is the relay 7. This relay operates to reduce the generator voltage when the relay is energized as is hereinafter explained. As a preferred arrangement, the relay 7 and thermal relay 11 are provided with an energizing circuit, running through the relays in series, which is across the line by way of the contacts 6c, a second pair of normally-closed contacts 6d associated with the timing relay 6, the contacts 11c and a pair of contacts 9b associated with the stopping relay 9; also, the relay 7 is adapted to operate instantly when connected to the line through the thermal relay 11, but the thermal relay 11 is adapted not to operate at all when connected across the line through the relay 7. Instead this relay operates only when energized continuously at full line voltage for a predetermined time interval, typically fifteen seconds. To so provide full line voltage to the relay 11 through the energizing circuit just mentioned, the relay 7 is at times shorted by the contacts 12c of a relay 12 which is controlled according to the load current. This energizing circuit through contacts 6c, 6d, 12c, 11c and 9b I herein term a first energizing circuit for the relay 11.

The contacts 9b are connected in parallel with the timing contacts 6c, and are closed when the relay 9 is energized. Since relay 9 is energized in response to the closing of the contacts 6c, contacts 9b take control away from the contacts 6c as soon as the latter close, and do so until the stopping relay is again deenergized to stop the generator. This is done in order that the contacts 6c need be closed only momentarily in order to start the generator (normally, the contacts 6c will be only momentarily closed because the timing relay 6 continues to run after the contacts 6c close until the generator gains normal speed and begins supplying normal current to the load and/or battery).

The starting relay 8 has also a pair of normally-open contacts 8b which close when the relay is energized. The effect of the closing of these contacts and of the contacts 9b is to provide a second energizing circuit directly across the line for the thermal relay 11. It will be apparent for the reasons explained in the following paragraph, that if the engine does not start or the generator does not gain normal voltage following the closing of contacts 6c, this second energizing circuit is kept closed and, consequently, at the expiration of the fifteen-second operating period for the relay 11, the contacts 11c will open. The opening of these contacts breaks the energizing circuits of the starting and stopping relays 8 and 9, and of the thermal relay itself, causing the starting circuit 2 to open, the stopping circuit 3 to close and the engine D to come therefore to standstill. Of course, this immediate stopping of the engine occurs only when something is wrong with the engine or generator to prevent the generator voltage from gaining normal value within the prescribed fifteen-second interval following the closing of the contacts 6c. Normally, the engine will gain speed within this interval and the operation will proceed as follows:

The generator voltage will build up, and upon reaching a value slightly above the nominal battery voltage, the winding 4a of the relay 4, which is connected directly across the generator, is energized to close the contacts 4c and to open the contacts 4b. The closing of the contacts 4c serves to connect the generator to the line 1 so that the generator will supply current to the load L and charging current to the battery B. This generator current flows through a winding 4d of the relay 4 and has the effect of aiding the voltage winding 4a to hold the contacts 4b open and the contacts 4c closed. The effect of the opening of contacts 4b is to break the circuit of the starting relay 8. Thus upon the generator reaching substantially a normal voltage within a fifteen-second interval following the closing of contacts 6c the starting circuit 3 is opened as are also the contacts 8b. The opening of the contacts 8b serves to break the second-mentioned energizing circuit for the thermal relay 11. It will accordingly be understood that the aforementioned second energizing circuit for the relay 11 is controlled by the generator voltage, and that this energizing circuit is held open while the generator voltage is at a normal value.

If the generator voltage builds up to normal value, it is the independent values of the battery-charging current and of the load current which control the stopping of the generator. For instance, there is the relay 5 in the battery circuit and the relay 12 in the load circuit, which together control the first-mentioned energizing circuit for the thermal relay 11. The contacts 5c of the relay 5 are held open whenever a charging current is supplied to the battery which is above a predetermined value, i. e., the battery-charging current tapers as the battery becomes more nearly charged and the relay 5 is set to operate at a predetermined point on the taper; likewise, the contacts 12c of the relay 12 are held open whenever a heavy current is supplied to the load. If, however, both the battery B is substantially charged and the load current is light when the generator is connected first to the line, the contacts 5c and 12c will stay closed. As a result, full line voltage will be applied through the first-mentioned energizing circuit to the thermal relay 11 as soon as the contacts 6c close to start the generator. The thermal relay 11 will accordingly be operated after its fifteen-second timing period to break the energizing circuit of the stopping relay 9, and in response thereto the stopping circuit 3 will be closed and the engine will be brought to standstill. Thus, upon the generator being started while the battery is charged and a light load condition exists, the generator is again stopped after a predetermined interval established by the operating period of the thermal relay 11. During this interval, and during the shutdown period of the generator, the timing relay 6 continues in operation. At the expiration of a normal shutdown period, the contacts 6c will be again closed and the generator will be again started.

If the battery is discharged or a heavy load current condition exists when the generator is next restarted, the generator continues to run as is hereinafter explained. For stabilizing the voltage of the generator there is a standard voltage regulator 13. This regulator is set so that the generator will normally supply a considerably higher voltage than the nominal voltage of the battery. For example, the nominal voltage of the battery may typically be 64 volts and the normal voltage of the generator may be 80 or more volts. The regulator 13 comprises a carbon pile rheostat 14 which is subjected to a predetermined compression and connected electrically in series with the shunt field of the generator. Also, the regulator comprises the potential coil 15 connected across the generator through a fixed resistance 16. The potential coil has an armature 17, diagrammatically shown, which is coupled to the carbon pile rheostat for relieving pressure on the carbon pile when the generator voltage rises, and vice versa, so as to decrease and increase the shunt field current with rising and falling generator voltage and tend thereby to maintain the generator voltage constant.

Also, the regulator 13 comprises a current coil 18 in series with the generator which is provided for safeguarding the generator from overload, the safeguarding function being performed by reducing the generator voltage when the current demand on the generator approaches its rated capacity. For example, the current coil may be coupled by an armature 19, diagrammatically shown, to the armature 17 so as to take control away from the potential coil and relieve pressure on the carbon pile when the current reaches a predetermined maximum value. As the pressure is so relieved from the carbon pile the resistance of the rheostat increases and the shunt field decreases to decrease the voltage of the generator.

Also connected across the generator through an adjustable resistance 20 is a winding 5b of the differential relay 5. The current flow through this winding is in aiding relation of the battery-charging current through the winding 5a, but the effect of winding 5b is insufficient in itself to open the contacts 5c of the relay, as is hereinafter more fully explained.

Should the battery B be in a discharged condition and a light-load-current condition exist when the generator is next restarted, the generator will supply heavy charging current through winding 5a to the battery and this current, with the aid of the current flowing through the winding 5b, will cause the contacts 5c to open. One effect of the opening of contacts 5c is to break the circuit of the timing relay 6. Thus, when the generator begins supplying a substantial charging current to the battery, the timing relay is brought to standstill. A second effect of the opening of contacts 5c is to break the aforementioned first energizing circuit of the thermal relay 11, which is the circuit by way of the contacts 5c, 8d, 12c, 11c and 8b. Since the other supply circuit of the thermal relay 11 through the contacts 8b is already open, in view of the relay 8 being deenergized as soon as the generator voltage builds up to normal value as hereinbefore explained, the thermal relay is now kept deenergized and the contacts 11c are held closed. Accordingly, the relay 9 is now kept energized and the stopping circuit 3 is held open. Thus, on starting the generator while the battery is in discharged state, the generator continues to run to supply charging current to the battery. This is true irrespective of the load current condition, because the contacts 12c, which are controlled by the load current, are now without effect on the relay 7 since this relay is already disconnected from the line by reason of the contacts 5c being now open.

Should there still be a light load condition when the battery reaches a charged condition, the closing of contacts 5c in response to the battery becoming charged causes full line voltage to be impressed upon the thermal relay 11 through its first energizing circuit since the relay 7 will now be shorted by contacts 12c. As soon as the fifteen-second timing period of the thermal relay 11 expires, the contacts 11c are opened and the circuit of relay 9 is broken. The engine-stopping circuit 3 is accordingly closed by contacts 9a, and the engine is brought to standstill. Also, the closing of contacts 5c will restore energizing current to the timing relay 6 to put this relay again into operation for determining the time interval of shutdown of the generator. Thus, when the sum of the load- and battery-charging currents falls to a predetermined level below which it is uneconomical to run the generator, the generator is stopped for a predetermined interval and the battery carries the load during that time.

On the other hand, should there be a heavy load current condition when the battery becomes substantially charged, the closing of contacts 5c in response to the battery reaching such charged condition will cause relay 7 to be energized since the contacts 12c across this relay are now held open, the energizing circuit of the relay 7 being by way of contacts 5c and 6d, the winding of thermal relay 11 and contacts 11c and 9b. The relay 7 is now operated, but the relay 11 does not operate—i. e., the contacts 11c stay closed—because the voltage impressed on this relay is less than the line voltage by the drop across the relay 7. The stopping relay 9 thus continues to be energized, with the result that the stopping circuit 3 is held open and the generator is kept running. Also, the circuit of the timing relay 6 is held open by the contacts 7c of relay 7. Thus, whenever there is a heavy-load-current condition the generator continues to run even though the battery is in a fully-charged condition and the timing relay 6 is kept out of operation.

It is a feature of the present invention that when the battery reaches a substantially charged condition while a heavy-load-current requirement still exists, the generator will continue to run but its voltage will be reduced to substantially the nominal value of the battery voltage. This is done to save power and to prevent the battery from becoming overcharged. The reduction in the generator voltage is effected by connecting a resistor 21 in shunt across resistor 16 so that the potential coil 15 will receive more current and will further relax the pressure on the carbon pile rheostat 14 to cause a reduction in the generator voltage. The shunting of resistor 16 by resistor 21 is controlled by a pair of normally-open contacts 7a of the relay 7. These contacts are closed when the relay 7 is energized, which it will now be because contacts 5c are held closed in view of the battery being in a discharged condition and contacts 12c are held open in view of the presence of a heavy-load-current condition.

In order to stabilize the voltage supplied to the load L, a voltage regulator 22 is connected in the line 1 adjacent to the load. This regulator comprises a carbon pile rheostat 23 in series with the line and a potential coil 24 in shunt with the load. The potential coil has associated therewith an armature 25 which is for controlling the pressure on the carbon pile rheostat 23 in accordance with the potential across the load, the operation being to relax the pressure on the rheostat as the load voltage rises, and vice versa.

It will be understood that the operation of the regulator 22 is on a power-consuming basis, it operating to consume more power when the generator voltage is high and less when the generator voltage is low. Typically, the potential drop in the regulator may be 15 volts when the generator voltage is set to its higher value but may be only a few volts when the generator voltage is set to its lower value. As a typical average value, the load current may be 50 amperes under heavy-load-current conditions, and the difference in power consumed by the regulator as between the higher and lower voltage settings of the generator may be approximately 600 watts. It will however be noted that by automatically controlling the voltage of the generator as above described, this loss of power is sustained only while the battery is undergoing charge.

When the generator voltage is suddenly reduced in response to the closing of contacts 5c, the battery voltage is initially above the line voltage by substantially the difference between the higher and lower voltage settings of the generator. Consequently, the battery tends temporarily to supply a heavy discharge current to the load. In order that this discharge current will not energize relay 5 sufficiently to open its contacts 5c and cause "hunting" or a temporary instability of the system, the relay is provided with the winding 5b as aforementioned. Since windings 5a and 5b are additive in their effects when charging current is supplied to the battery, a discharge current through winding 5a is in opposed relation to winding 5b and the resultant action of the two windings is not strong enough to operate the relay. The sudden reduction in generator voltage is therefore prevented from disturbing the stability of operation of the system.

As a protective means for preventing the starting mechanism from being put into operation during the period immediately following the closing of relay 5, there is provided the relay 10. This relay has a winding 10a connected directly across the generator, and is adapted to open its contacts 10c when the generator voltage reaches a predetermined maximum value and not to close these contacts until the generator voltage falls substantially below this value. Typically, for the system here described, the maximum operating voltage for the relay may be 66 volts—i. e., just slightly above the nominal battery voltage—and the lower operating voltage for the relay may be 30 volts. (Since the voltages at which the relay closes and opens are materially different, the relay may be termed a "voltage differential relay.") The contacts 10c of this relay are normally closed and serially connected in a circuit of the starting relay 8. When the generator voltage rises above 66 volts contacts 10c are opened, as are also contacts 8a in the engine-starting circuit 2, and the starting circuit is therefore prevented from being put into operation. Also, the contacts 10c stay open until the generator voltage next falls below the 30-volt value prescribed. When the relay 5 closes in response to the battery reaching a charged condition there may be momentary surges of current in the generator circuit which may operate relay 4. This operation occurs by reason of the battery having momentarily a higher voltage than the generator, causing a momentary current to flow in a reverse direction from normal through the current winding 4d whereat a counteracting effect on the voltage winding 4a is produced to effectively deenergize the relay 4 and cause contacts 4b to close and contacts 4c to open. Were contacts 4b to close, and relay 10 not provided, the starting relay 8 would be operated to put the engine-starting mechanism into operation while the engine is still running. When relay 10 is provided, however, the circuit of the starting relay 8 is held open because the surges of generator voltage will not possibly fall below 30 volts during the stabilizing period following the closing of relay 5, with the result that contacts 10c stay open during this period. When the generator comes almost to rest following shutdown of the engine, contacts 10c close as will also contacts 4b and current will be supplied by the battery to the starting relay 8 as soon as the timer relay contacts 6c again close.

In wholly automatic systems such as are here described, it is desirable as a practical matter that the battery shall be subjected to extra charging at predetermined intervals so as to compensate for accumulated losses in charge which the battery may undergo as a result, for example, of idle stands of the railway cars in the yards. Preferably, this additional charge is provided by running the generator an additional interval, say five to thirty minutes, upon the load- and battery-charging currents falling to their minimum values after a predetermined number of successive shutdowns of the generator. For this purpose the timing relay 6 is provided with the additional pair of contacts 6d. These contacts are normally closed but are held open during a predetermined portion of each revolution of the cam 60 by an auxiliary cam 63 carried by the cam 60. This auxiliary cam may comprise a portion 64 fixedly secured to the cam 60 and an overlapping portion 65 which is adjustable angularly about the axis of rotation of the cam 60 for varying the effective length of the auxiliary cam. The fixed portion 64 of the auxiliary cam is diagonally opposite one of the notches 62 designated as 62a. As the cam 60 is advanced during shutdown of the generator to bring the notch 62a into engagement with the contact arm of the switch 6c, the switch 6c is closed and relays 8 and 9 are energized as heretofore explained to cause the starting circuit 2 to be closed and the stopping circuit 3 to be opened, thereby causing the generator to be started. Upon the battery B becoming substantially charged and there existing simultaneously a light-load-current condition, contacts 5c and 12c will be closed. No voltage will however be impressed on the thermal relay 11 because now the energizing circuit of relays 7 and 11 is broken by reason of the contacts 6d being held open by the auxiliary cam 63. Accordingly, contacts 7c stay closed to maintain the timing relay in operation and the thermal relay 11 is kept deenergized to cause relay 9 to stay energized and stopping circuit 3 to be held open. Accordingly, in response to the contacts 6d being now open, the generator continues to run as does also the timing relay 6. As the generator so continues to run it generates voltage at its higher value because the relay 7 is now kept deenergized by reason of the contacts 5d being now open. Upon the timing relay advancing the auxiliary cam to a point where contacts 6d again close, energizing current is supplied to the thermal relay 11 through contacts 5c, 6d, 12c, 11c and 9b and upon expiration of the fifteen-second operating period of this relay the contacts 11c again open to deenergize the relay 9 and to cause the engine to be stopped. The timing relay continues however to stay in operation and upon the contacts 6c again closing following the closing of contacts 6d the engine is again restarted and the operation continues as hereinbefore described.

The length of this additional charging period is established by the peripheral length of the auxiliary cam 63 and this peripheral length may vary typically from a fraction of one space to two spaces of the cam 60 so as to give an additional charging period from five to thirty minutes. With one auxiliary cam as described, the additional charging will occur once for each revolution of the cam 60, or once after every six or seven shutdown periods of the generator, depending upon the length of the auxiliary cam relative to the main cam 60.

While I have herein particularly described my invention in terms of a preferred embodiment thereof, it will be understood that this embodiment is subject to many changes and modifications without departure from the scope of my invention, which I endeavor to express according to the following claims.

I claim:

1. In a power supply system including a battery, a generator for supplying current to a load and charging current to said battery, said battery serving to supply the power during temporary intervals when the generator is stopped, means for driving said generator and means for stopping said drive means: a control system for said stopping means comprising a first relay controlled by said battery-charging current, a second independent relay controlled by said load current, and means operatively connecting said relays with said stopping means for controlling the stopping means in accordance with the independent values of said charging and load currents.

2. In a power supply system including a battery, a generator for supplying current to a load and charging current to said battery, said battery serving to supply the power during temporary intervals when the generator is stopped, means for driving said generator and means for stopping said drive means: the combination of a first control device operated into first and second positions by said battery-charging current as said current rises above and falls below a predetermined value; a second control device operated into first and second positions by said load current as the load current rises above and falls below a predetermined value; and means operatively coupling said control devices to said stopping means, for rendering the stopping means effective only when said control devices occupy predetermined ones of their said respective positions.

3. In a power supply system including a battery, a generator for supplying current to a load and charging current to said battery, said battery serving to supply the power during temporary intervals when the generator is stopped, means for driving said generator and means for stopping said drive means: the combination of a first control device operated into first and second positions by said battery-charging current as said current rises and falls below a predetermined value; a second control device operated into first and second positions by said load current as the load current rises above and falls below a predetermined value; and means, operatively coupling said control devices to said stopping means, to cause said drive means to be stopped only when both said charging current and said load current are below their said respective predetermined values.

4. In a power supply system including a battery, a generator for supplying current to a load and charging current to said battery, said battery serving to supply the power during temporary intervals when the generator is stopped, and means for driving said generator: the combination of a control device associated with said load and differently controlled according to whether the load current is above or below a predetermined value; a thermal relay means operated upon energization for a predetermined interval at a prescribed voltage for stopping said drive means; and means controlled by said control device for reducing the supply voltage to said thermal relay means below said prescribed voltage upon said load current being above said predetermined value.

5. In a power supply system including a battery, a generator for supplying current to a load and charging current to said battery, said battery serving to supply the power during temporary intervals when the generator is stopped, and means for driving said generator: the combination of a thermal relay means operated upon energization for a predetermined interval at a prescribed voltage for stopping said drive means; an energizing circuit for said thermal relay means; and means controlled by the charging current to said battery for holding said energizing circuit open when said battery-charging current is above a predetermined value.

6. In a power supply system including a battery, a generator for supplying current to a load and charging current to said battery, said battery serving to supply the power to the load during temporary periods when said generator is stopped, and means for driving said generator: the combination of a control means for setting the voltage of said generator at the nominal value of said battery voltage or at a predetermined value thereabove; a first electrical means effective when energized at a prescribed voltage for placing said control means at a lower voltage setting; a second electrical means effective when energized at a predetermined voltage which is above said prescribed voltage for stopping said drive means; means effective upon said battery being substantially charged for supplying energizing current to said first electrical means through said second electrical means; and means effective upon said load current falling below a predetermined value for shorting said first electrical means whereby to increase the voltage across said second electrical means and render the same effective to stop said drive means.

7. In a power supply system including a battery, a generator for supplying current to a load and charging current to said battery, said battery serving to supply the power to the load during temporary periods when said generator is stopped, and means for driving said generator: the combination of a control means for setting the voltage of said generator to higher and lower values; means for stopping said drive means; a first control device controlled according to whether the charging current is above or below a predetermined value; a second control device controlled according to whether the load current is above or below a predetermined value; and means, operatively associating said control devices with both said voltage control means and said stopping means, for shifting said voltage control means to higher and lower voltage settings upon said battery-charging current being above and below its said predetermined value and for operating said stopping means upon both said battery-charging current and said load current being simultaneously below their said respective values.

8. In a power supply system including a battery, a generator for supplying load and charging current to said battery, said battery serving to supply the power during temporary intervals when the generator is stopped, and means for driving said generator: the combination of means for stopping said drive means; electrically-energizable timing means effective upon being continuously energized for a predetermined interval for automatically starting said drive means; and means controlled in accordance with the independent values of said charging current and said load current for putting said stopping means into operation and concurrently initiating energization of said timing means.

9. In a power supply system including a battery, a generator for supplying current to a load and charging current to said battery, said battery serving to supply the power during temporary intervals when the generator is stopped, and means for driving said generator: the combination of means controlled by said charging and load currents for stopping said drive means; timing means for automatically restarting said drive means upon the expiration of a predetermined interval following the operation of said stopping means; and means associated with said timing means and effective after a predetermined number of operations of said stopping means for putting the stopping means into ineffective condition for a predetermined time interval.

10. In a power supply system including a battery, a generator for supplying load and charging current to said battery, said battery serving to supply the power during temporary intervals when the generator is stopped, and means for driving said generator: the combination of control means for setting the voltage of said generator at the nominal voltage of said battery or at a predetermined value thereabove; a relay controlled by said battery-charging current for causing said voltage-control means to be at a higher voltage setting when the battery is in a discharged condition and to be at a lower voltage setting upon the battery reaching a substantially charged condition; and circuit means energized by said generator and associated with said relay to be effective thereon in aiding relation with the action of a flow of battery-charging current through said relay, for rendering said relay relatively insensitive to flow of battery-discharging current during operation of said generator.

11. In a power supply system including a battery, a generator for supplying current to a load and charging current to said battery, said battery serving to supply the power during temporary intervals when the generator is stopped, and means for driving said generator: the combination of means for starting said drive means; and electrically-energizable means differentially responsive to voltage supply thereto according to whether the voltage is rising or falling, said electrically-energizable means being connected to said generator and associated with said starting means for rendering the starting means inoperable when the generator voltage has built up from zero to substantially the nominal voltage of said battery and for rendering said starting means operable only upon said generator voltage falling to a value substantially below the nominal voltage of said battery.

12. In a power supply system including a battery, a generator for supplying current to a load and charging current to said battery, said battery serving to supply the power during temporary intervals when the generator is stopped, and means for driving said generator: the combination of a control device electrically energizable to stop said drive means; an energizing circuit for said device controlled by the voltage of said generator; and a second energizing circuit for said device controlled by said battery-charging current and said load current according to whether said currents are above or below respective predetermined values.

13. In a power supply system including a load, a battery connected thereto, a generator for supplying current to said load and charging current to said battery, said battery serving to supply the load current during intervals when the generator is stopped, and means for driving said generator: the combination of current-responsive circuit means controlled by current to and from said battery for setting the voltage of said generator at a value substantially higher than that of said battery when the battery-charging current is above a predetermined set value, and for setting the voltage of said generator at substantially the value of said battery when said charging current falls below said set value; and means associated with said voltage-setting means and controlled by current from said generator for rendering the voltage-setting means substantially insensitive to battery-discharging current whereby a momentary battery discharge following as an incident to reducing the voltage of said generator is prevented from restoring the voltage of the generator to its said higher value.

14. In a power supply system including a load, a battery connected thereto, a generator for supplying current to said load and charging current to said battery, said battery serving to supply the load current during intervals when the generator is stopped, and means for driving said generator: the combination of a starting circuit controllable to put said generator into operation; current-energizable means operated by current from said generator to said load and battery for holding said starting circuit in inoperative condition; means for reducing the voltage of said generator from higher to lower operating values upon said battery becoming substantially charged; and means associated with said starting circuit for maintaining the same in inoperative condition during the interim between the instant said generator voltage reaches an operating value and the instant said generator voltage next falls by a predetermined amount below said lower operating value whereby a momentary release of said holding means caused by a momentary discharge current of said battery through said generator, as an incident following the reduction in voltage of the generator, is prevented from putting said starting circuit into operation.

15. In a power supply system including a battery, a generator for supplying current to a load and charging current to said battery, said battery serving to supply the power during temporary intervals when the generator is stopped, means for driving said generator, and means for starting said drive means: the combination of means for stopping said drive means; means for setting the voltage of said generator to a value above the nominal voltage of said battery or to substantially said battery voltage; means effective after a predetermined number of operations of said stopping means for holding the stopping means in ineffective condition for a predetermined time interval; and means operatively associating said last-stated means with said voltage-setting means, for maintaining said generator at its higher voltage setting while said stopping means is in ineffective condition.

DONALD G. IHRIG.